United States Patent

Padwick et al.

[15] 3,703,936
[45] Nov. 28, 1972

[54] SNOWMOBILE SUSPENSION

[72] Inventors: Herbert W. Padwick, 93 Calder Crescent; Lawrence P. Fay, 628 Royal Street, both of Regina, Saskatchewan, Canada

[22] Filed: Sept. 24, 1970

[21] Appl. No.: 75,440

[52] U.S. Cl. .................. 180/5 R, 180/9.58, 305/27
[51] Int. Cl. .............................................. B62m 27/02
[58] Field of Search....... 180/5 R, 9.24, 9.58; 305/27, 305/24, 28

[56] References Cited

UNITED STATES PATENTS

| | | | |
|---|---|---|---|
| 1,542,149 | 6/1925 | Landry | 305/27 |
| 3,404,745 | 10/1968 | Smieja | 180/5 R |
| 3,285,676 | 11/1966 | Hetteen | 305/27 |
| 3,483,936 | 12/1969 | Nilsson | 180/5 R |
| 3,480,096 | 11/1969 | Hammitt | 180/9.24 |

OTHER PUBLICATIONS

Polaris '71, Fist on the Freedom Trail Advertizing Brochure of Polaris Industries, July 30, 1970, pgs. 10 and 11.

*Primary Examiner*—Richard J. Johnson
*Attorney*—Kent & Ade

[57] ABSTRACT

A suspension for a snowmobile having a driven endless belt thereunder for propulsion; a wheel-supported resilient framework within and riding on the lower part of the belt, carries the rear sprockets for the belt, and supports the front and rear ends of the snowmobile chassis; and adjustable means are provided at one end of the chassis for compressing the framework against the sprockets at the opposite end of the framework for increase in the resilient chassis support, and to maintain the belt tight on the sprockets.

8 Claims, 9 Drawing Figures

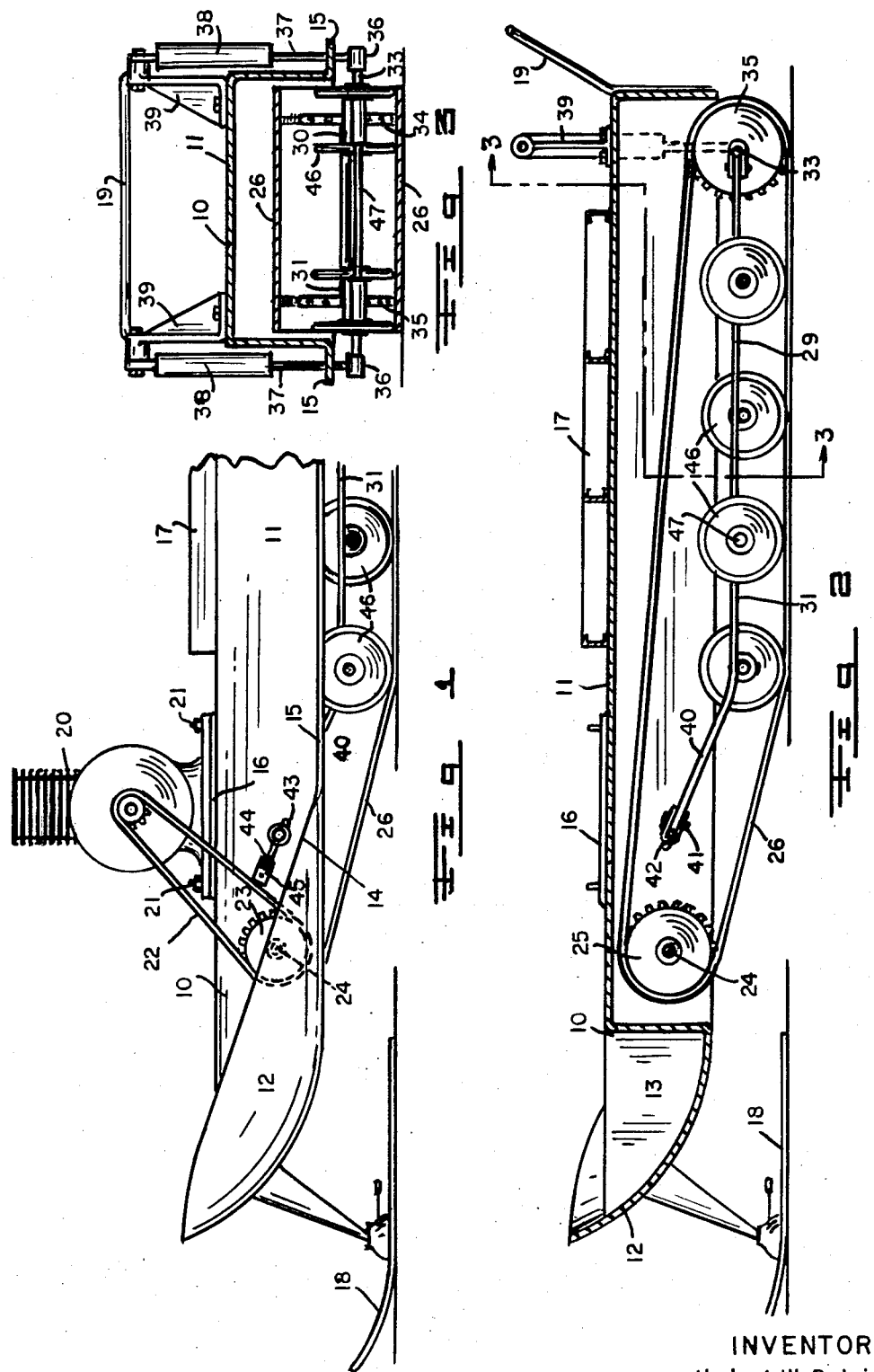
INVENTORS
Herbert W. Padwick
Lawrence P. Fay

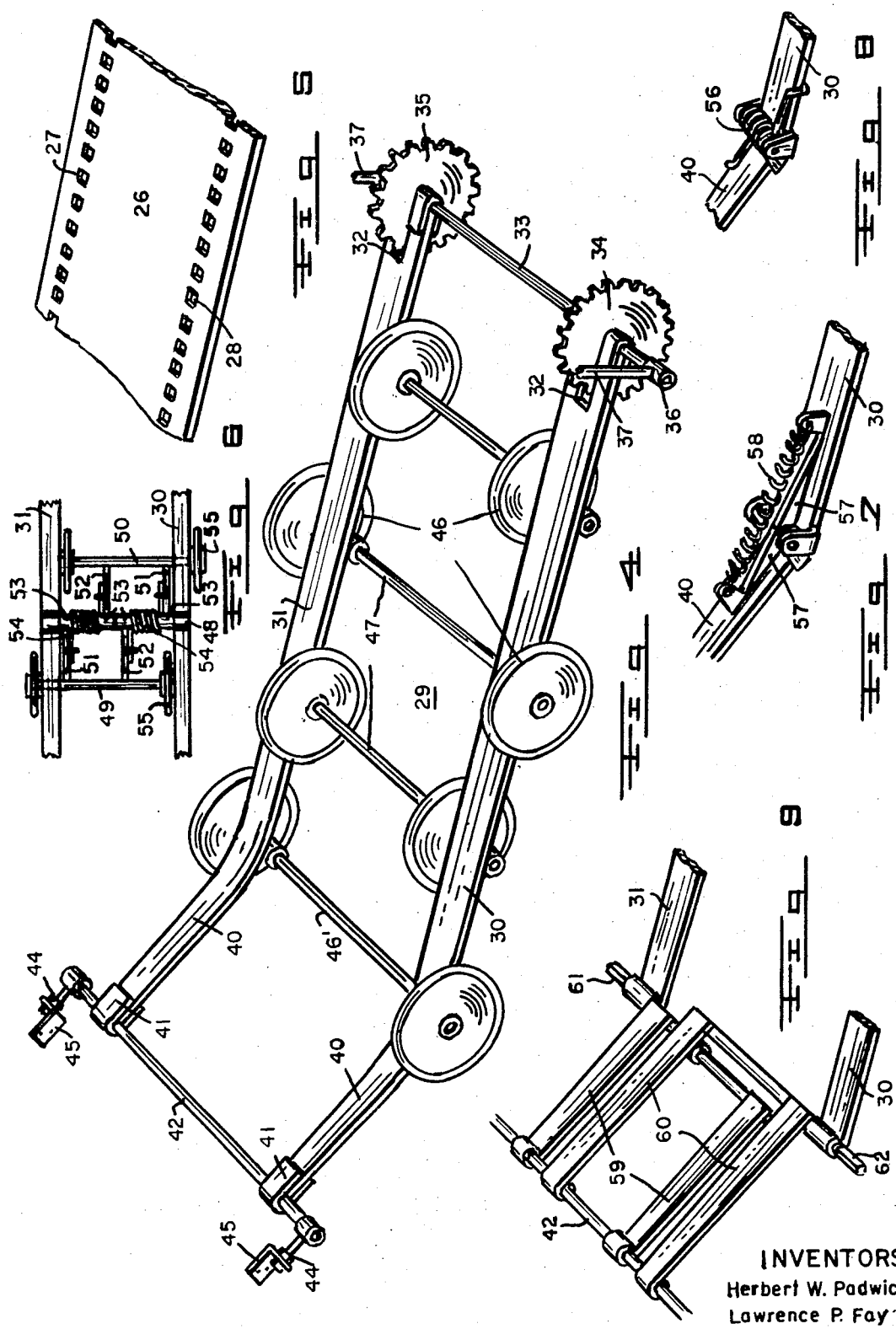

3,703,936

SNOWMOBILE SUSPENSION

The present invention relates to the construction of motor vehicles, such as those for travel over snow and ice, and wherein the driving element is in the form of an endless track or belt, driven by an internal combustion engine on the vehicle.

These vehicles, generally known as snowmobiles, usually consist of an open light chassis or frame to carry one or two riders, and are front supported by steerable skis while the rear portion is carried on flexible jack-knife type of wheels which ride the above mentioned belt. In order that the endless belt be kept in alignment while driven, it is usually provided with two parallel rows of spaced track holes, one along each side thereof, which are engaged by driving sprockets at one end and idler sprockets at the other end. In such a construction, and particularly when said jack-knife wheels are used, no arrangement is provided to keep the belt tight on the sprockets, so that any resiliency between the chassis and the wheels will permit the belt to flatten and lengthen as the chassis comes down and then, as the chassis rises, the belt will suddenly tighten on the sprockets. This results in whipping of the belt at high speeds and may permit escape of one or more sprockets to later ruin the belt as it tightens.

The principal object of the present invention is: to provide a suspension for the chassis of a snowmobile which will keep the belt tight on the sprockets at all times and prevent such damage, while providing resiliency between the chassis and the wheels so they can accommodate uneven ground surface and insulate the chassis from sudden shocks.

With the above important and other minor objects in view, which will become more apparent as the disclosure progresses, the invention principally consists in the design, arrangement and construction of the various parts which will be later explained, reference being had to the accompanying drawings wherein:

FIG. 1 is a side view of the front of a snowmobile.

FIG. 2 is a vertical longitudinal sectional view along the machine shown in FIG. 1.

FIG. 3 is a vertical cross sectional view of the machine taken along the dot and dash line 3—3 of FIG. 2.

FIG. 4 is an enlarged perspective view of the snowmobile suspension ready for the installation shown in FIG. 2.

FIG. 5 is a perspective view of a portion of the endless belt.

FIG. 6 is a reduced plan of a modified wheel arrangement for the rail framework.

FIGS. 7 and 8 show different spring constructions as modifications of the rail framework.

FIG. 9 shows a torsion construction as a further modification for the framework rails.

In the drawings like characters of reference indicate corresponding parts in the several figures.

A frame 10 is formed from sheet metal which is pressed into an inverted boxing 11 (FIG. 2) of narrow width and nearly the full length of the machine. The forward end of the frame is dished as at 12 into a shape somewhat similar to the front of a boat, so it will ride the snowbanks while reinforced by forwardly extending vertical webs 13 from the front end of the boxing. The sides of this dished portion are wider than the boxing and each come down at an angle 14 (FIG. 1) to flat gutters 15 which outwardly project from the bottom of the boxing and extend the full length therealong. These gutters, at the angled sides 14, form guarded foot rests for the feet of the rider. A horizontal motor stand 16 is provided on the front of the boxing, and a rear framing 17 thereon is adapted to receive a padded seat (not shown) for the rider or riders to sit on. Guiding skis 18 support the forward dished part 12 of the frame and are suitably steered (not shown) while a cross guard rail 19 is carried by the rear end of the boxing 11.

An engine, preferably internal combustion, is indicated at 20 and is bolted at 21 to the stand 16 and thru an endless chain 22 drives a sprocket 23 on a shaft 24 which passes through the boxing 11 and is suitably bearinged (not shown) in the walls thereof. This shaft, within the boxing, is provided with a pair of spaced sprockets 25 which drive an endless ground belt 26 of slightly narrower width than the inside of the boxing. A portion of this belt is shown in perspective in FIG. 5 and it will be noted that each side is provided with a line of sprocket receiving track holes 27 and 28 which are adapted to receive the teeth of said driving sprockets 25.

The suspension 29 for the above described frame 10 is shown installed therein in FIG. 2, and as this suspension is the principal basis of the present invention it is shown per se in enlarged perspective in FIG. 4, and will now be described:

A pair of spaced tapered straps or spring rails 30 and 31 form a framework for the suspension and both are downwardly sprung for a purpose later explained. The relatively wide rear ends of these rails are each forked at 32 and all such forks are secured to a cross axle 33 which connects the rails and carries a pair of sprockets 34 and 35, each of which are free to rotate in one of the forked ends of the rails. These latter sprockets are spaced apart the correct distance to ride in the lined holes 27 and 28 of the endless belt 26. The ends of the cross axle 33 extend past the forked ends 32 of the rails and are each provided with a bearing 36 having an upwardly projecting standard 37. These standards pass through slots (not shown) in the gutters 15 and each support a suitable shock absorber 38 (spring or hydraulic), the upper end of which is pivotally carried by a stand bracket 39 on the rear surface of the boxing 11, one on each side. Accordingly, the rear end of the frame 10 is supported by the sprockets 34 and 35.

The front ends of the rails 30 and 31 are bent upwardly at a slant, as shown at 40, and their extreme upper ends are secured at 41 to a cross shaft 42, the ends of which pass through slots 43 in the walls of the boxing and are adjustably mounted on bolts and nuts 44 to angle bars or brackets 45 carried on the outer sides of the boxing walls. When the nuts and bolts 44 are adjusted, they move the cross shaft 42 in the slots 43 and end-shift the rails 30 and 31 against the rear axle 33 to tighten the belt 26 on the sprockets 34 and 35, while at the same time varying the resiliency of the rails 30 and 31.

The framework of spring rails 30 and 31 is supported on a plurality of wheels 46 which are bearinged on the rails. In the present showing, these wheels are in pairs, each on opposite ends of a plurality of axles 47 which are carried in spaced relation along the rails. It will be noted that the wheels are staggered by using long and short axles and half ride on the belt 26 at the outer side of the sprocket holes 28 and 29 while the other half ride on the belt at the inner sides of these holes, as shown in FIG. 3. It will also be noted that the axles 47 are evenly spaced apart along the rails 30 and 31, the bearings therefor being welded to the rails. Due to the rails being downwardly sprung, as previously mentioned, a resilient downward pressure is maintained on the belt by the wheels and permit it to accommodate the various undulations of the ground surface over which it travels, while smoothly supporting the frame 10 from the rear axle 33 and at the front adjustments 44, while the belt itself is held tightly to the sprockets 34-35.

It might be mentioned at this time that the wheels could be individually carried on alternating stub shafts, mounted along each of the spring rails 30 and 31, without using cross axles therefor, as the shaft 42 and the rear axle 33 would maintain the spacing of the rails. Further, many manufacturers of snowmobiles are now using a system of jack-knife wheels for their suspension, so-called because the axles of the wheels spring apart in the units. Such a one is shown in Canadian Pat. No. 714,454, July 27, 1965 to "Marier." FIG. 7 of this patent has been copied in the present FIG. 6 for a better understanding, and now explained. A main cross shaft 48 normally has each end mounted in the sides of the main frame of the snowmobile and a pair of shorter parallel axles 49 and 50 are positioned on each side. The axles each carry a pair of spaced inwardly projecting arms 51 and 52 which terminate in bearings 53 mounted on the shaft 48, while a pair of coil springs 54 encircle the bearings and are each sprung between a set of the arms 51 and 52 to complete the unit. Any number of these units may be mounted along the interior of the main frame, depending on its length, and constitutes the complete suspension therefor, a rear sprocket axle 33 also being provided in fixed bearings (not shown) for the propelling belt, and as used in this construction. The springs 54 of these jack-knife units take the shocks of the support wheels 55. These units have proved practical, except as mentioned at the start of this specification, re the releasing of the sprockets by the belt. In the present suspension construction 29, these jack-knife units can be used to advantage for further resiliency, when attached as follows:

The ends of the main cross shaft 54 of each unit are mounted on the spring rails 30 and 31, either above or below, so the axles 49 and 50 float freely on either side, and as many as needed are positioned therealong. This is shown in FIG. 6 and it will be noted that the rails are located between each outer pair of wheels 55 of the units. While these wheels travel on either side of the spaced track holes 27 and 28 due to the axles being offset, these axles could be of different lengths as per the present disclosure and the wheels track in the manner shown in FIG. 4, if desired. Under either arrangement, added resilience would be built-in the suspension while the tread belt 26 would still be maintained tight on the drive and idling sprockets.

From the above it will be seen that this new suspension 29 is built around the adjusted downward resiliency of the rails 30 and 31 against the rear axle 33, and while these rails appear flat in FIG. 2 and 4, their normal tendency or reaction is to lift the front wheels and belt off the ground through the axle 46' as these wheels are the first affected by the sprung rails. Actually, it is to be assumed that the weight of the frame 10 is maintaining the belt in ground contact through the wheels and therefore the rails are in the flat position. The adjustments 44 are used to maintain the wheels in such contact with the belt when properly adjusted. When the frame is heavy, the rails are inclined to lift at the center so the adjustments are operated to further compress the rails against the rear axle 33 and bring this central part down. Conversely, when the frame is light, the front wheels are inclined to lift, so the resilient pressure is released sufficiently to lower them.

As the adjustments 44 act through the slanted portions 40 of the rails and at the portion above the axle 46', a series of three modifications for hinged control at this point are shown in FIGS. 7, 8 and 9. A single lifting spring 56 is shown in FIG. 8 to hold the separated and hinged part 40 elevated above the horizontal rail 30 to give the required tension. In FIG. 7, a pair of abutting angle plates 57 are carried by the two parts 40 and 30, which are resiliently and hingedly brought together by an over riding coil spring 58. The arrangement in FIG. 9 is a torque system of bars 59 and 60 from the cross shaft 42 to the rails 30 and 31, the torque being applied by a wrench (not shown) at the socket heads 61 and 62. It will be understood that the same adjustment 44 is used in all figures for downward spring pressure on the rails 30 and 31.

It will now be appreciated that we have developed a very simple framework 30-31 for resiliently holding the belt wheels 46 to their work, including those 55, while smoothly supporting the main frame 10 as the belt 26 undulates over uneven ground. While we have shown evenly spaced axles along the rail framework on which the belt wheels are mounted, it will be seen that the jack-knife unit system of wheels can be used instead and would resiliently improve the suspension, as shown in FIG. 6, while the elevated angled ends 40 of the framework rails can be materially strengthened at the axle 46' by the modifications shown in FIGS. 7, 8 and 9. Once the adjustments 44 are set for a given weight of the frame 10, no further adjustments thereto are needed, unless the weight is changed or the adjustments themselves slip.

What we claim as our invention is:

1. In combination with a snowmobile frame having an endless belt thereunder which is end sprocket driven for propulsion of the frame thereon; a suspension for said frame, comprising: a wheel-supported resilient framework within said belt and riding the ground-supported face thereof; said framework resiliently supporting the front and rear end of said frame and carrying idler sprockets for the opposite end rotation of said belt; adjustments on said frame for end-moving the framework and said idler sprockets for frame-supporting resiliency of the framework, and to maintain the belt tight on said sprockets, and two wheel-supported resilient rails forming the framework and underlying said frame; one of the ends of said rails being bent upwardly to connect with a cross shaft, the outer ends of which pass through slots in the frame walls to connect with said adjustments on the exterior of the frame, said adjustments operating to move the ends of said cross shaft along said slots, in the tightening and loosening of said belt.

2. A snowmobile frame suspension as defined in claim 1, wherein a cross axle is mounted on the rear end of the framework to rotatably support said idler sprockets, and the outer ends of said axle resiliently support the rear part of said frame, through shock absorbers.

3. A snowmobile suspension as defined in claim 1, wherein the front ends of said rails are separately hinged to the rear parts thereof and resiliently reinforced against hinging.

4. In combination with a snowmobile frame; a suspension therefor, comprising: a resilient wheel-supported framework; sprockets rotatably mounted across one end of said framework, and said end resiliently supporting one end of said snowmobile frame, while the opposite end of the framework supports the opposite end of said frame; the central part of the framework downwardly sprung for resiliency between the frame and said framework supporting wheels; an endless belt encircling said suspension, with one end looped over and meshing with said sprockets, another end thereof looped over and meshing with further sprockets rotatably carried by the frame, and said supporting wheels riding the lower interior of the belt; means carried by the frame for power driving said latter sprockets; adjustment means at one end of the frame support for varying the resiliency of the framework to tighten or loosen the belt on said sprockets, two wheel-supported resilient rails forming the framework and underlying said frame; one of the ends of said rails being bent upwardly to connect with a cross shaft, the outer ends of which pass through slots in the frame walls to connect with said adjustments on the exterior of the frame, said adjustments operating to move the ends of said cross shaft along said slots, in the tightening and loosening of said belt.

5. A snowmobile frame suspension as defined in claim 4, wherein a cross axle is mounted on the rear end of the framework to rotatably support said idler sprockets, and the outer ends of said axle resiliently support the rear part of said frame, through shock absorbers.

6. A snowmobile suspension as defined in claim 4, wherein the front ends of said rails are separately hinged to the rear parts thereof and resiliently reinforced against hinging.

7. In combination with a snowmobile frame having an endless belt thereunder and which is front sprocket-driven for propulsion of said frame; a suspension therefor, comprising: a pair of spaced tapered and resilient rails supported on off-set wheels therealong to provide a portable framework below said frame; the rear wide ends of said rails each forked and carrying a cross axle therebetween, and the front narrow ends of the rails turned upwardly at an angle and secured to a cross shaft; said cross axle rotatably mounting a pair of sprockets each of which rotate in one of said forks; the outer ends of the cross axle each connected with a shock absorber on the snowmobile frame for rear support thereof; the ends of said cross shaft passing through slots in the frame sides and secured to brackets for front support of the snowmobile frame from the framework; a drive shaft rotatably mounted across the front part of the snowmobile frame and carrying a pair of spaced sprockets therealong; sprocket-receiving tracks along each side of said belt; said belt encircling the suspension with the tracks thereof meshing with the sprockets of the drive shaft and of the cross axle, and with the offset wheels riding the lower interior face thereof on either side of the tracks; means on said brackets for adjustably shifting the ends of the cross shaft along said slots for increasing the frame support resiliency of the framework, and tightening the belt on said sprockets; and means for driving said drive shaft.

8. A snowmobile suspension as defined in claim 7, wherein the front ends of said rails are separately hinged to the rear parts thereof and resiliently reinforced against hinging.

* * * * *